United States Patent
Gehret et al.

(10) Patent No.: US 10,581,810 B1
(45) Date of Patent: Mar. 3, 2020

(54) WORKSTATION LOG-IN

(71) Applicant: MicroStrategy Incorporated, Vienna, VA (US)

(72) Inventors: John Gehret, Washington, DC (US); Gary Gabriel, Annandale, VA (US); Yong Qiao, Vienna, VA (US); Ali Alavi, Arlington, VA (US); Xiaochen Du, Annandale, VA (US)

( * ) Notice: Subject to any disclaimer, the term of this patent is extended or adjusted under 35 U.S.C. 154(b) by 0 days.

(21) Appl. No.: 16/250,512

(22) Filed: Jan. 17, 2019

Related U.S. Application Data (63) Continuation of application No. 14/793,186, filed on Jul. 7, 2015, now Pat. No. 10,212,136.

(60) Provisional application No. 62/021,463, filed on Jul. 7, 2014.

(51) Int. Cl.
*H04L 29/06* (2006.01)

(52) U.S. Cl.
CPC ........ *H04L 63/0428* (2013.01); *H04L 63/083* (2013.01)

(58) Field of Classification Search
None
See application file for complete search history.

(56) References Cited

U.S. PATENT DOCUMENTS

| | | | | |
|---|---|---|---|---|
| 5,812,764 A | * | 9/1998 | Heinz, Sr. | G06F 21/31 726/5 |
| 6,061,790 A | ‡ | 5/2000 | Bodnar | G06F 21/445 380/282 |

(Continued)

FOREIGN PATENT DOCUMENTS

| | | | |
|---|---|---|---|
| WO | 2010052669 | ‡ | 5/2010 |
| WO | WO2010052669 | | 5/2010 |

OTHER PUBLICATIONS

Kambourakis, Georgios et al. Using SSL/TLS in Authentication and Key Agreement Procedures of Future Mobile Networks. 4th International Workshop on Mobile and Wireless Communications Network. https://ieeexplore.ieee.org/stamp/stamp.jsp?tp=& arnumber= 1045713 (Year: 2002).*

(Continued)

*Primary Examiner* — Jeremiah L Avery (74) *Attorney, Agent, or Firm* — Fish & Richardson P.C.

(57) ABSTRACT

A method including actions of pairing with a mobile device and receiving a user name, a password encrypted with a connector password key, and a public key of the mobile device. Additional actions include providing the password encrypted with the connector password key, receiving the password in a decrypted form, obtaining a pairing key, encrypting the pairing key using the public key, encrypting the password with a local password key, providing the pairing key encrypted using the public key and the password encrypted with the local password key, disconnecting from the mobile device, after disconnecting form the mobile device, reconnecting with mobile device, providing a workstation identification, receiving the user name and the password encrypted with the local password key, decrypting the password encrypted with the local password key, and logging in the user using the user name and the password decrypted with the local password key.

20 Claims, 10 Drawing Sheets

(56) References Cited

U.S. PATENT DOCUMENTS

| | | | | |
|---|---|---|---|---|
| 6,317,829 B1 ‡ | 11/2001 | Van Oorschot | .... | G06Q 20/3672 713/155 |
| 6,694,431 B1 * | 2/2004 | Binding | .............. | H04L 63/0428 713/152 |
| 6,720,860 B1 ‡ | 4/2004 | Narayanaswami | ..... | G06F 21/31 340/5 |
| 7,284,127 B2 * | 10/2007 | Gehrmann | ............ | H04L 9/0841 380/277 |
| 7,378,939 B2 ‡ | 5/2008 | Sengupta | ................ | H04M 1/67 340/5 |
| 7,395,549 B1 ‡ | 7/2008 | Perlman | ................. | H04L 9/0825 380/279 |
| 7,400,878 B2 ‡ | 7/2008 | Hassan | .................... | G06F 21/31 455/41 |
| 7,418,596 B1 * | 8/2008 | Carroll | .................. | H04L 63/068 713/169 |
| 7,424,615 B1 * | 9/2008 | Jalbert | .................. | H04L 9/3273 380/283 |
| 7,599,493 B2 * | 10/2009 | Sandhu | ................. | H04L 9/3271 380/277 |
| 7,600,676 B1 ‡ | 10/2009 | Rados | .................... | G06Q 20/40 235/38 |
| 7,734,045 B2 ‡ | 6/2010 | Sandhu | ................... | H04L 9/302 380/44 |
| 7,979,899 B2 ‡ | 7/2011 | Guo | .................... | H04L 63/0823 726/20 |
| 8,286,227 B1 ‡ | 10/2012 | Zheng | ................. | H04L 63/0853 726/2 |
| 8,307,406 B1 ‡ | 11/2012 | Aboujaoude | ........... | G06F 21/40 709/22 |
| 8,327,422 B1 ‡ | 12/2012 | Friedman | ................. | G06F 21/44 713/168 |
| 8,371,501 B1 ‡ | 2/2013 | Hopkins | ................. | G06F 21/32 235/38 |
| 8,423,768 B2 ‡ | 4/2013 | Huang | .................... | G06F 21/33 713/168 |
| 8,467,770 B1 ‡ | 6/2013 | Ben Ayed | ............. | H04L 63/107 455/41 |
| 8,498,618 B2 ‡ | 7/2013 | Ben Ayed | ............. | H04L 63/0492 455/41.2 |
| 8,601,602 B1 ‡ | 12/2013 | Zheng | ................. | H04L 63/0853 726/2 |
| 8,621,005 B2 ‡ | 12/2013 | Boyd | ................. | G06Q 10/1095 709/20 |
| 8,625,796 B1 ‡ | 1/2014 | Ben Ayed | ........... | H04L 63/0853 380/25 |
| 8,711,656 B1 ‡ | 4/2014 | Paulson | ............... | H04B 7/2603 367/135 |
| 8,955,081 B2 ‡ | 2/2015 | Metke | .................... | H04W 12/06 726/7 |
| 9,075,979 B1 ‡ | 7/2015 | Queru | ..................... | G06F 21/34 |
| 9,301,139 B2 ‡ | 3/2016 | Korgaonkar | ......... | H04W 12/06 |
| 9,520,918 B2 ‡ | 12/2016 | Adrangi | ................. | H04B 5/00 |
| 9,741,033 B2 ‡ | 8/2017 | Bhatnagar | .......... | H04L 63/0838 345/158 |
| 10,212,136 B1 | 2/2019 | Gehret et al. | | |
| 10,231,128 B1 | 3/2019 | Ziraknejad et al. | | |
| 2002/0180586 A1 ‡ | 12/2002 | Kitson | .................... | G06F 21/32 340/5 |
| 2002/0194500 A1 ‡ | 12/2002 | Bajikar | ............... | H04L 63/0853 726/35 |
| 2003/0046589 A1 ‡ | 3/2003 | Gregg | .................... | G06F 21/335 726/5 |
| 2003/0065919 A1 ‡ | 4/2003 | Albert | .................... | G06F 21/31 713/168 |
| 2004/0203595 A1 ‡ | 10/2004 | Singhal | ................ | G06Q 20/32 455/41 |
| 2004/0243856 A1 ‡ | 12/2004 | Shatford | ................. | G06F 21/32 726/5 |
| 2005/0044393 A1 ‡ | 2/2005 | Holdsworth | ........... | G06F 21/34 726/26 |
| 2005/0221798 A1 ‡ | 10/2005 | Sengupta | ................. | H04M 1/67 455/41 |
| 2005/0268107 A1 ‡ | 12/2005 | Harris | .................... | G06F 21/31 713/18 |
| 2005/0269401 A1 ‡ | 12/2005 | Spitzer | ................. | G06Q 20/32 235/38 |
| 2006/0083208 A1 ‡ | 4/2006 | Lin | ....................... | H04W 76/11 370/33 |
| 2006/0242423 A1 ‡ | 10/2006 | Kussmaul | ............... | G06F 21/32 713/18 |
| 2007/0061590 A1 ‡ | 3/2007 | Boye | .................... | G06F 21/305 713/18 |
| 2007/0130472 A1 ‡ | 6/2007 | Buer | ................... | H04L 63/0428 713/182 |
| 2008/0016537 A1 ‡ | 1/2008 | Little | .................... | H04L 63/0853 725/81 |
| 2008/0052775 A1 ‡ | 2/2008 | Sandhu | ................. | G06F 21/6263 726/14 |
| 2008/0250147 A1 ‡ | 10/2008 | Knibbeler | ........... | H04L 63/0492 709/22 |
| 2008/0289030 A1 ‡ | 11/2008 | Poplett | .................... | G06F 21/31 726/15 |
| 2009/0093215 A1 ‡ | 4/2009 | Eisenbach | ........... | G06F 21/6218 455/41 |
| 2009/0313687 A1 ‡ | 12/2009 | Popp | ................... | H04L 9/3228 726/9 |
| 2010/0031345 A1 ‡ | 2/2010 | Sinclair | .................... | G06F 21/34 726/19 |
| 2010/0063895 A1 ‡ | 3/2010 | Dominguez | ........... | G06Q 20/02 705/26 |
| 2010/0120406 A1 ‡ | 5/2010 | Banga | .................... | G06F 1/3203 455/41 |
| 2010/0275010 A1 ‡ | 10/2010 | Ghirardi | ................. | G06F 21/35 713/155 |
| 2011/0081860 A1 ‡ | 4/2011 | Brown | ............... | H04N 1/00347 455/41.3 |
| 2011/0169654 A1 ‡ | 7/2011 | Ketari | ................ | G08B 13/1427 340/68 |
| 2011/0221590 A1 ‡ | 9/2011 | Baker | .................... | A61B 5/0002 340/539.12 |
| 2011/0314539 A1 ‡ | 12/2011 | Horton | .................... | G06F 21/35 726/20 |
| 2012/0066749 A1 ‡ | 3/2012 | Taugbol | ................. | G06F 21/35 726/6 |
| 2012/0272279 A1 ‡ | 10/2012 | Lim | .................. | H04N 21/23892 725/109 |
| 2013/0041938 A1 ‡ | 2/2013 | Lin | ....................... | G06F 3/0488 709/203 |
| 2013/0159699 A1 ‡ | 6/2013 | Torkkel | ............... | G06F 21/6245 713/155 |
| 2013/0173915 A1 ‡ | 7/2013 | Haulund | ............ | H04L 9/3226 713/159 |
| 2013/0237190 A1 ‡ | 9/2013 | Smith | ................... | H04L 63/0492 455/411 |
| 2013/0268881 A1 ‡ | 10/2013 | Bartkiewicz | .......... | G06F 3/0484 715/780 |
| 2014/0040991 A1 ‡ | 2/2014 | Potonniee | ............... | H04L 63/08 726/4 |
| 2014/0062874 A1 ‡ | 3/2014 | Suggs | ................. | G06F 3/0325 345/158 |
| 2014/0067678 A1 ‡ | 3/2014 | Lee | ....................... | G06Q 20/02 705/44 |
| 2014/0108810 A1 ‡ | 4/2014 | Chenna | .................... | H04L 9/321 713/179 |
| 2014/0164774 A1 * | 6/2014 | Nord | .................... | G06F 21/602 713/171 |
| 2014/0173695 A1 ‡ | 6/2014 | Valdivia | ................. | G06F 21/36 726/4 |
| 2014/0189808 A1 ‡ | 7/2014 | Mahaffey | ............. | H04L 63/083 726/4 |
| 2014/0273845 A1 ‡ | 9/2014 | Russell | ................. | H04W 76/023 455/41.2 |
| 2014/0298432 A1 ‡ | 10/2014 | Brown | .................... | H04L 63/083 726/6 |
| 2014/0304505 A1 * | 10/2014 | Dawson | ................. | G06F 21/6227 713/165 |
| 2014/0330560 A1 ‡ | 11/2014 | Venkatesha | .......... | G06F 21/32 704/23 |

(56) References Cited

U.S. PATENT DOCUMENTS

| | | | | |
|---|---|---|---|---|
| 2014/0337956 | A1‡ | 11/2014 | Korgaonkar | H04W 12/06 726/9 |
| 2014/0366123 | A1‡ | 12/2014 | DiBona | G06F 21/60 726/16 |
| 2015/0074230 | A1‡ | 3/2015 | Lee | G06F 3/04817 709/219 |
| 2015/0121488 | A1‡ | 4/2015 | Vaughn | H04L 63/08 726/6 |
| 2015/0135310 | A1‡ | 5/2015 | Lee | A61B 5/681 726/20 |
| 2015/0178721 | A1‡ | 6/2015 | Pandiarajan | G06Q 20/382 705/75 |
| 2015/0270971 | A1‡ | 9/2015 | Dietrich | G06F 21/35 713/168 |
| 2015/0302856 | A1‡ | 10/2015 | Kim | G10L 17/22 704/27 |
| 2015/0310452 | A1‡ | 10/2015 | Baitch | G06Q 30/018 705/2 |
| 2015/0319142 | A1‡ | 11/2015 | Herberg | H04L 63/0428 713/171 |
| 2015/0350894 | A1‡ | 12/2015 | Brand | H04L 63/0435 380/270 |
| 2015/0358315 | A1‡ | 12/2015 | Cronin | H04L 63/0861 726/6 |
| 2016/0192194 | A1‡ | 6/2016 | Yang | H04W 12/08 713/171 |
| 2016/0267732 | A1‡ | 9/2016 | Agrafioti | G06F 21/40 |
| 2016/0378992 | A1‡ | 12/2016 | Nguyen | G06F 21/35 726/19 |
| 2017/0237565 | A1‡ | 8/2017 | Rommel | H04L 9/3226 713/171 |

OTHER PUBLICATIONS

Ho, Ying-Kwei; Liu, Ru-Sheng. On-demand QoS-based Routing Protocol for Ad Hoc Mobile Wireless Networks. Fifth IEEE Symposium on Computers and Communications, Proceedings ISCC 2000. https://ieeexplore.ieee.org/stamp/stamp.jsp?tp=& arnumber=860696 (Year: 2000).*
Tsai, Kun-Lin et al. High-efficient Multi-Key Exchange Protocol based on Three-party Authentication. 2014 Eighth International Conference on Innovative Mobile and Internet Services in Ubiquitous Computing. https://ieeexplore.ieee.org/stamp/stamp.jsp?tp=&:amp;arnumber=6975512 (Year: 2014).‡
Nam, Junghyun et al. Security Enhancement to a Password-Authenticated Group Key Exchange Protocol for Mobile Ad-Hoc Networks. IEEE Communications Letters, vol. 12, Issue: 2. https://ieeexplore.ieee.org/stamp/stamp.jsp?tp=&arnumber=4450664 (Year: 2008).‡
Qi-Na et al. The Implementation of FPGA-based RSA public-key algorithm and its application in mobile-phone SMS encryption system. 2011 First International Conference on Instrumentation, Measurement, Computer, Communication and Control.‡
"MacID: Unlock your Mac with just your fingerprint," Kane Cheshire, Mar. 2015, [retrieved on Dec. 30, 2015]. Retrieved from the Internet: URL<http://macid.co/>. 4 pages.
"Near Lock—Lock and unlock your Mac with your iPhone," Oct. 2014, [retrieved on Dec. 30, 2015]. Retrieved from the Internet: URL<http://nearlock.me/>. 6 pages.
"Near Lock—Lock and unlock your Mac with your iPhone: FAQ," Dec. 2014, [retrieved on Dec. 30, 2015]. Retrieved from the Internet: URL<http://nearlock.me/faq>. 3 pages.
"The Usher Identity Platform: A description of MicroStrategy's mobile identity solution," Usher by MicroStrategy, Apr. 17, 2014, 15 pages.
"Usher Mobile Identity Platform: Deliver biometric-caliber security across the enterprise," Usher by MicroStrategy, Jan. 11, 2014, 24 pages.

"Usher Mobile Identity Platform: Security Architecture," Usher by MicroStrategy, Jul. 23, 2014, 20 pages.
"Apple Watch Programming Guide," Apple.com, Mar. 9, 2015, 81 pages.
"Apple Watch User Guide, Version 1.0," Apple.com, Apr. 23, 2015, 96 pages.
"Availability of two-factor authentication in iOS 9 and OS X El Capitan," Apple.com, Apr. 5, 2016, URL<https://support.apple.com/en-us/HT205075>, 3 pages.
"Google Nexus Unlock," Google Support, accessed on Apr. 19, 2016, URL<http://support.google.com/nexus/answer/6093922>, 7 pages.
"With a Flick of the Wrist, Security Just Got Even Easier," Duo Security Blog, May 5, 2015, URL<https://duo.com/blog/duo-for-apple-watch>, 10 pages.
Barker, Ian, 'Betanews.com,' "MicroStrategy platform Ushers in password-free security," Apr. 2015, [retrieved on Dec. 30, 2016]. Retrieved from the Internet: URL<https://betanews.com/2015/04/02/microstrategy-platform-ushers-in-password-free-security/>. 1 page.
Bertino et al., "Location-Aware Authentication and Access Control—Concepts and Issues," 2009 International Conference on Advanced Information Networking and Applications, 2009, pp. 10-15.
Buckley, "Here's the Official Apple Watch User Guide," Gizmodo, Apr. 23, 2015, URL<http://gizmodo.com/heres-the-official-apple-watch-user-guide-1699820199>, 2 pages.
Cahill et al., "MicroStrategy Introduces Enterprise Security Platform Usher™, Debuts Usher Software Development Kit," MicroStrategy Inc., Apr. 2015, 2 pages.
Fazackerley, Mark, "Usher Functionality," LinkedIn Corporation, Apr. 2014, retrieved from the Internet: URL<http://www.slideshare.net/markfazackerley3/usher-functionality >. 12 pages.
Fidoalliance.org [online]. "Mobile Connect & FIDO," GSMA, 2014, retrieved from the Internet: URL<https://fidoalliance.org/wp-content/uploads/David-Poillington-GSMA.pdf>. 11 pages.
Hall, "Apple Watch uses constant skin contact to validate Apple Pay purchases," 9to5Mac, Sep. 10, 2014, URL<http://9to5mac.com/2014/09/10/apple-watch-uses-constant-skin-contact-to-validate-apple-pay-purchases/>, 9 pages.
Hellotether.com [online]. "Lock and unlock your Mac automatically with your iPhone," Fi a Fo Ltd., Dec. 2015, URL<www.hellotether.com>. 10 pages.
Jansen et al., "Proximity-based Authentication for Mobile Devices," Proceedings of the 2005 International Conference on Security and Management, pp. 398-404, Jun. 20, 2005.
Janos et al., "A New Approach in a Multifactor Authentication and Location-based Authorization," ICIMP 2011: The Sixth International Conference on Internet Monitoring and Protection, pp. 50-53, Mar. 20, 2011.
Kastrenakes, Jacob, "Knock app lets you unlock your Mac by tapping your iPhone," The Verge, Nov. 2013, [retrieved on Dec. 30, 2015]. Retrieved from the Internet: URL<http://www.theverge.com/2013/11/5/5069614/knock-iphone-app-wirelessly-unlocks-your-mac>. 2 pages.
Knocktounlock.com [online]. "Introducing Knock 2.0: Unlock your Mac faster and more securely than ever," Aug. 2013, [retrieved on Dec. 30, 2015]. Retrieved from the Internet: URL<http://www.knocktounlock.com>. 3 pages.
Knocktounlock.com [online]. "Knock FAQ: Faster and safer than typing a password. Just Knock. For iPhone + Mac," Nov. 2013, [retrieved on Dec. 30, 2015]. Retrieved from the Internet: URL<http://www.knocktounlock.com/faq/>. 8 pages.
Knocktounlock.com [online]. "Knock/Help: Search for answers," Mar. 2014, [retrieved on Dec. 30, 2015]. Retrieved from the Internet: URL<http://help.knocktounlock.com/>. 5 pages.
Lee, "Apple Watch Will Use Skin Contact to Authenticate Contactless Payments," Ubergizmo, Sep. 10, 2014, URL<http://www.ubergizmo.com/2014/09/apple-watch-will-use-skin-contact-to-authenticate-contactless-payments/>, 2 pages.
Lee, Justin, "Inside MicroStrategy's biometric mobile identity platform Usher," Biometrics Research Group, Inc., Apr. 2015, [retrieved on Dec. 30, 2016]. Retrieved from the Internet: URL<http://www.biometricupdate.com/201504/inside-microstrategys-biometric-mobile-identity-platform-usher>. 1 page.

(56) References Cited

OTHER PUBLICATIONS

Macrumors.com' [online]. "'Knock' Aims to Let you Unlock Your Mac With Your Apple Watch," Apr. 2015, [retrieved on Dec. 30, 2015]. Retrieved from the Internet: URL<http://www.macrumors.com/2015/04/22/knock-unlock-mac-with-apple-watch/>. 8 pages.

MicroStrategy.com [online]. "Introduction to Usher," MicroStrategy Inc., Jun. 2014, retrieved from the Internet: URL<https://mobileapps.microstrategy.com/usher/MSTREmployeeFAQ/MSTREmployeeFAQ.html >. 10 pages.

MicroStrategy.com [online]. "Usher Help: Version 2.4.07," MicroStrategy Inc., 2015, retrieved from the Internet: URL<http://www2.microstrategy.com/producthelp/Usher/2.4.07/UsherHelp.pdf>. 197 pages.

MicroStrategy.com [online]. "Usher Mobile Identity Platform: Deliver biometric-caliber security across the enterprise," MicroStrategy Inc., Jan. 2014, retrieved from the Internet: URL<https://www.microstrategy.com/Stmtegy/media/downloads/products/usher_overview-presentation.pclf >. 24 pages.

MicroStrategyhelp.atlassian.net [online]. "Usher Security," Mar. 2016, [retrieved on Dec. 30, 2016]. Retrieved from the Internet: URL<https://microstrategyhelp.atlassian.net/wiki/display/README103/Usher+Security>. 10 pages.

Miners, "5 things the Apple Watch can do, and 5 things it can't," PCWorld, Sep. 10, 2014, URL<http://www.pcworld.com/article/2605140/5-things-the-apple-watch-can-and-cant-do.html>, 6 pages.

Mobileconnect.io [online]. "Secure digital identity is now in your hands: Mobile Connect is a new service that lets you login to websites and apps on any device without having to remember usernames or passwords. You are safely identified through your mobile phone number," Mobile Connect, Mar. 2015, URL<https://mobileconnect.io/>. 12 pages.

Nam et al. Security Enhancement to a Password-Authenticated Group Key Exchange Protocol for Mobile Ad-Hoc Networks. IEEE Communications Letters, vol. 12, Issue: 2., dated Feb. 2008, 3 pages.

Qi-Na et al. "The implementation of FPGA-based RSA public-key algorithm and its application in mobile-phone SMS encryption system," 2011 First International Conference on Instrumentation, Measurement, Computer, Communication and Control, year 2011, 4 pages.

Tsai et al. "High-efficient Multi-Key Exchange Protocol based on Three-party Authentication," 2014 Eighth International Conference on Innovative Mobile and Internet Services in Ubiquitous Computing, year 2014, 6 pages.

United States Office Action in U.S. Appl. No. 15/427,684, dated Mar. 13, 2018, 32 pages.

United States Office Action in U.S. Appl. No. 15/427,684, dated Nov. 17, 2017, 31 pages.

Usher.com [online]. "Usher Mobile Identity Platform: Security Architecture," MicroStrategy Inc., 2014, retrieved from the Internet: URL<https://www.microstrategy.com/Strategy/media/downloads/white-papers/Usher-v2-1ArchitectureWhitepaper.pclf >. 20 pages.

Wikipedia.com [online]. "Bluetooth," Jan. 2004, [retrieved on Mar. 10, 2017]. Retrieved from the Internet: URL<https://en.wikipedia.org/wiki/Bluetooth>. 25 pages.

Wikipedia.com [online]. "Pretty Good Privacy," Jan. 2004, [retrieved on Mar. 11, 2017]. Retrieved from the Internet: URL<https://en.wikipedia.org/wiki/Pretty_Good_Privacy>. 12 pages.

Wikipedia.com [online]. "Public key infrastructure," Jan. 2004, [retrieved on Dec. 20, 2016]. Retrieved from the Internet: URL<https://en.wikipedia.org/wiki/Public_key_infrastructure>. 7 pages.

Wikipedia.com [online]. "Public-key cryptography," Jan. 2004, [retrieved on Mar. 13, 2017]. Retrieved from the Internet: URL<https://en.wikipedia.org/wiki/Public-key_cryptography>. 16 pages.

Wikipedia.com [online]. "Security Assertion Markup Language," Nov. 2016, retrieved from the Internet: URL<https://en.wikipedia.org/wiki/Security_Assertion_Markup_Language>. 5 pages.

Wikipedia.com [online]. "Security token," Apr. 2005, [retrieved on Feb. 18, 2017]. Retrieved from the Internet: URL<https://en.wikipedia.org/wiki/Security_token>. 8 pages.

\* cited by examiner
‡ imported from a related application

Pair Your Device

Scan the QR code with your employee badge to pair your device with this computer

0:49

*Both your mobile device and workstation will need to be online

Searching for Mobile

Is your phone nearby? Make sure it's close enough to your computer and bluetooth is turned on. You're almost finished, this could take a moment.

WORKSTATION LOG-IN

CROSS-REFERENCE TO RELATED APPLICATIONS

This application is a continuation of U.S. application Ser. No. 14/793,186, filed Jul. 7, 2015, which claims the benefit of U.S. Provisional Application Ser. No. 62/021,463, entitled "WORKSTATION LOG-IN," filed Jul. 7, 2014. Both of these prior applications are incorporated by reference in their entirety.

TECHNICAL FIELD

This specification generally relates to logging into computers.

BACKGROUND

Access to computers may be secured by a user name and a password. To access a computer, the computer may require that a user log into the computer by entering a user name associated with a user account and a password associated with the user account. The computer may verify that the user account and password are valid and then log in the user.

SUMMARY

In some aspect, the subject matter described in the specification may be embodied in methods that include the actions of pairing with a mobile device and receiving, from the mobile device, a user name, a password encrypted with a connector password key, and a public key of the mobile device. Additional actions include providing, to the server, the password encrypted with the connector password key and receiving, from the server, the password in a decrypted form. Further actions include obtaining a pairing key and encrypting the pairing key using the public key of the mobile device. More actions include encrypting the password with a local password key and providing, to the mobile device, the pairing key encrypted using the public key of the mobile device and the password encrypted with the local password key. Further actions include providing a workstation identification to the mobile device and receiving, from the mobile device, the user name and the password encrypted with the local password key. More actions include decrypting the password encrypted with the local password key and logging in the user using the user name and the password decrypted with the local password key.

Other features may include corresponding systems, apparatus, and computer programs, configured to perform the actions of the methods, encoded on computer storage devices.

The details of one or more implementations are set forth in the accompanying drawings and the description, below. Other potential features and advantages of the disclosure will be apparent from the description and drawings, and from the claims.

DETAILED DESCRIPTION

Techniques are described for controlling use of credentials and resources that are associated with the credentials. As examples, the credentials may be licenses issued by government organizations (e.g., a license to practice medicine, a driver's license, a passport, a travel visa, etc.), degrees issued by institutes of learning (e.g., a collegiate degree issued by a university), a status denoting membership in a particular group (e.g., a badge of employment issued by a company, a gym membership, etc.), or any type of credential an organization or institute bestows on individuals. A credential may have associated with it one or more resources, such as keys, that a user has been granted by the credential-issuing organization. For example, the keys may enable the user to access physical resources (e.g., opening a door to a secured office, operating an elevator in a building with access-controlled floors, using equipment with restricted access, etc.) or may enable the user to access logical resources (e.g., accessing information stored in a computing device, a computing network, an electronic account, etc.).

In some implementations, a mobile device-based credential management application enables multiple different credential-issuing organizations to use the application to distribute and manage electronic credentials that are issued by the credential-issuing organizations. The credential management application may be hosted by an entity that is separate from the credential-issuing organizations. In an example, the credential management application enables a user to log-in to the application using authentication information for any of the credential-issuing organizations that have issued the user a credential. In addition, other of the credential-issuing organizations can specify whether they trust the credential-issuing organization for which the user used log-in information to log-in to the credential management application, and the credential management application will enable the user to access the user's credentials and/or related resources (e.g., keys) for those credential-issuing organizations that trust the credential-issuing organization for which the user used log-in information to log-in to the credential management application.

As such, the credential management application may facilitate a user having access to different credentials and/or keys that were issued by different credential-issuing organizations, without the user necessarily being required to separately remember and provide authentication information (e.g., username and passwords) for each individual credential-issuing organization. Instead, in some implementations, the user may log-in to the credential management application using authentication information for any one of the different credential-issuing organizations (or using authentication information for the credential management application itself), and may gain access to a variety of credentials and/or keys issued by different organizations that trust that authentication information. In some examples, each credential-issuing organization can indicate different levels of trust for different types of authentication information. Further, in some implementations, the credential management application may be able to handle different types of authentication information and authentication techniques associated with different credential-issuing organizations, even those that are not necessarily part of a single-sign-on network. Thus, the credential management application may provide a flexible and secure environment in which users may more easily access credentials and/or related resources (e.g., keys) issued by different organizations.

In some implementations, the credential management application may use geo-location information (e.g., as provided by the user's client device, or by a third party, etc.) to manage credentials and/or related resources (e.g., keys) based on the location of the user's client device. As an example, the application may make recommendations about which credential issuing organization the user should use to log-in to the credential management application based on the user's location. As another example, if a user attempts to access credentials and/or keys for an organization (or resources belonging to that organization), the credential management application may first verify that the user's physical location corresponds to a geographic region associated with the organization (or resources belonging to that organization) before allowing the user the access the credentials and/or keys.

Figure 1:
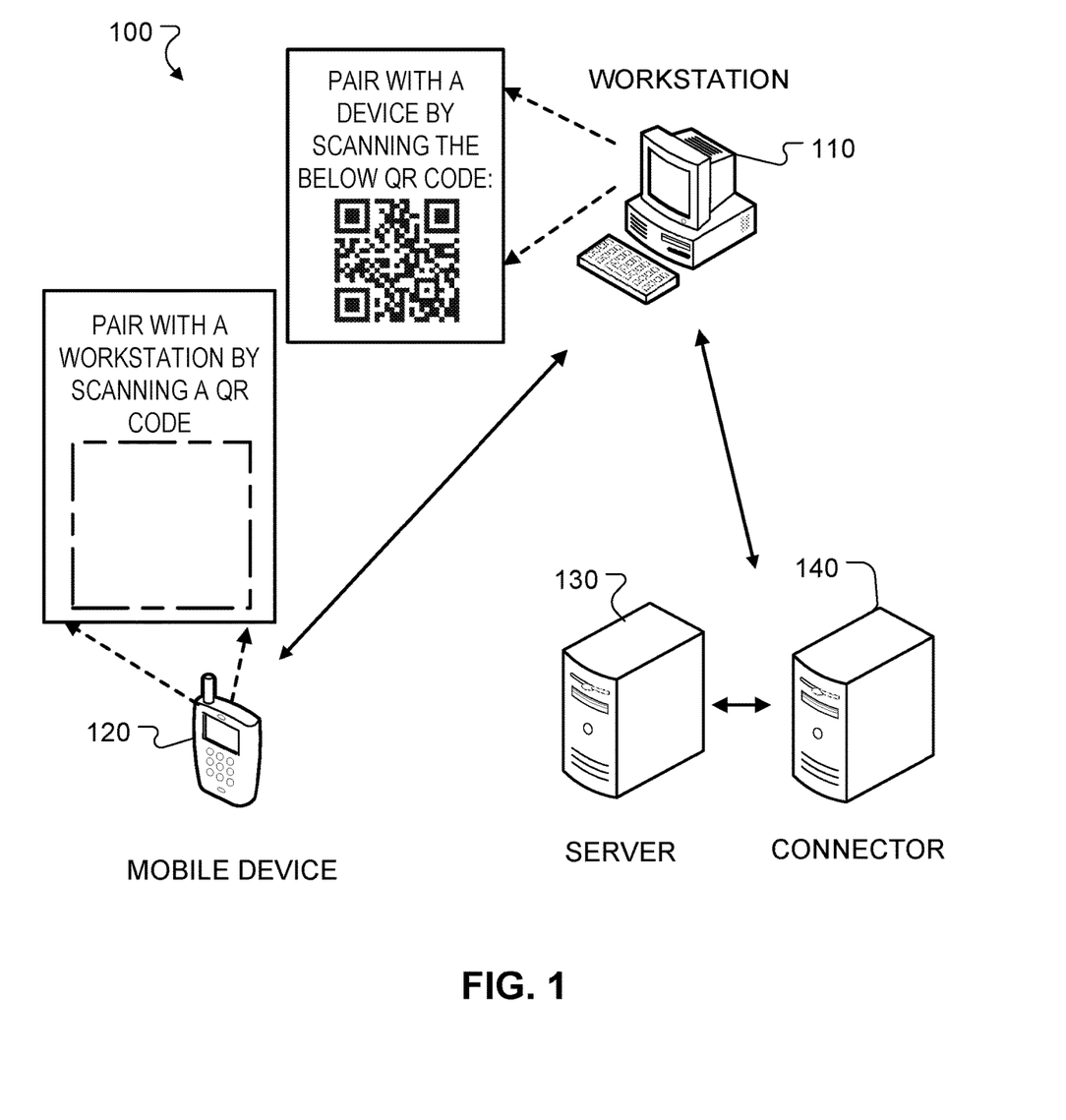
FIG. 1 is a diagram of an example system that enables log-in via Bluetooth.

FIG. 1 is a diagram of an example system 100 that enables log-in via Bluetooth. Generally, the system 100 may include a workstation 110, a mobile device 120, a server 130, and a connector 140.

The workstation 110 may be a computing device that a user wishes to log into to use. For example, the workstation 110 may be a desktop computer running a Windows operating system or an Apple operating system. The workstation 110 may enable a user to log into the workstation 110 by a conventional process of typing in a user name and a password. However, the workstation 110 may additionally or alternatively enable a user to log into the workstation using the mobile device 120. For example, using a mobile device-based credential management application on the mobile device 120. The workstation 110 may display an optical machine readable representation, e.g., Quick Response (QR) code, which the mobile device 120 may scan and use the mobile device-based credential management application to provide a user name and password to log into the workstation 110.

In the system 100, for security purposes, the mobile device 120 may not have access to both a user name and a password. Instead, the mobile device 120 may store the user name but store the password in encrypted form where the mobile device 120 is unable to decrypt the password. Stored passwords may be each encrypted with a connector password key or a local password key associated with the workstation 110. When the mobile device 120 is used to log into a particular workstation for the first time, the mobile device 120 may recognize that the mobile device 120 does not have a password that is encrypted with a local password key for the particular workstation and instead provide the password encrypted with the connector password key.

The particular workstation may provide the password encrypted with the connector password key to the server 130 to decrypt the password. The server 130 may verify that the password should be decrypted and determine the connector to decrypt the password. The server 130 may then provide the password encrypted with the connector password key to the determined connector 140. The connector 140 may decrypt the password and provide the decrypted password to the server 130, which may then provide the decrypted password to the particular workstation. The workstation 110 may then encrypt the password using a local password key for the workstation 110 and provide the password encrypted using the local password key to the mobile device 120.

When the mobile device 120 is later used to log into the particular workstation, the mobile device 120 may provide the password that is encrypted using the local password key so that the particular workstation does not need to involve the server 130 or connector 140 to log-in the user.

Figure 2A:
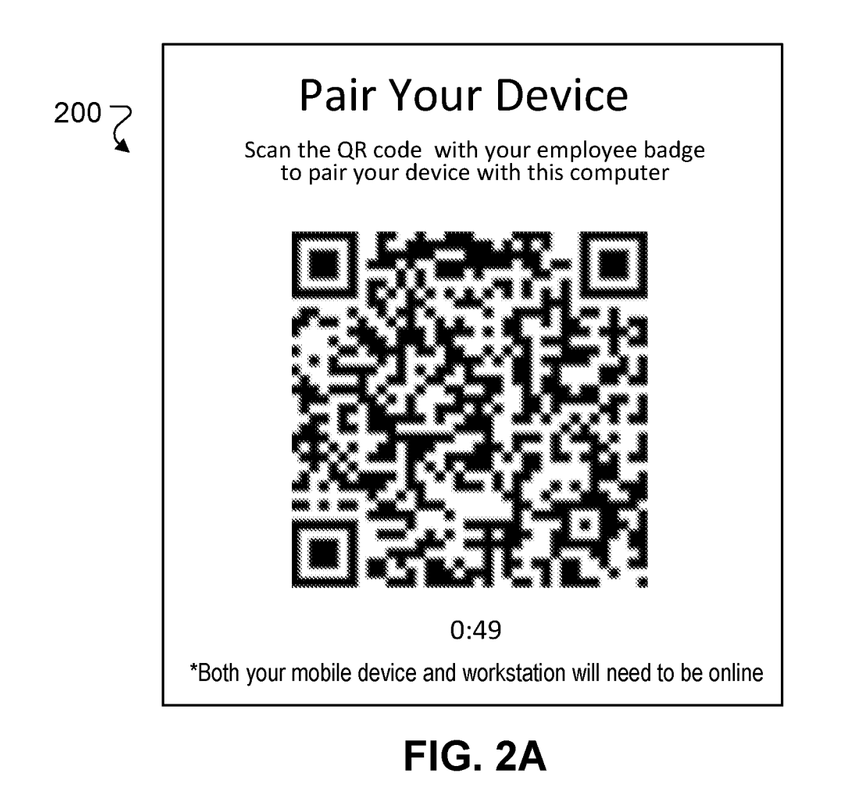
FIGS. 2A-C are example user interfaces from a workstation that enables log-in via Bluetooth.
Figure 2B:
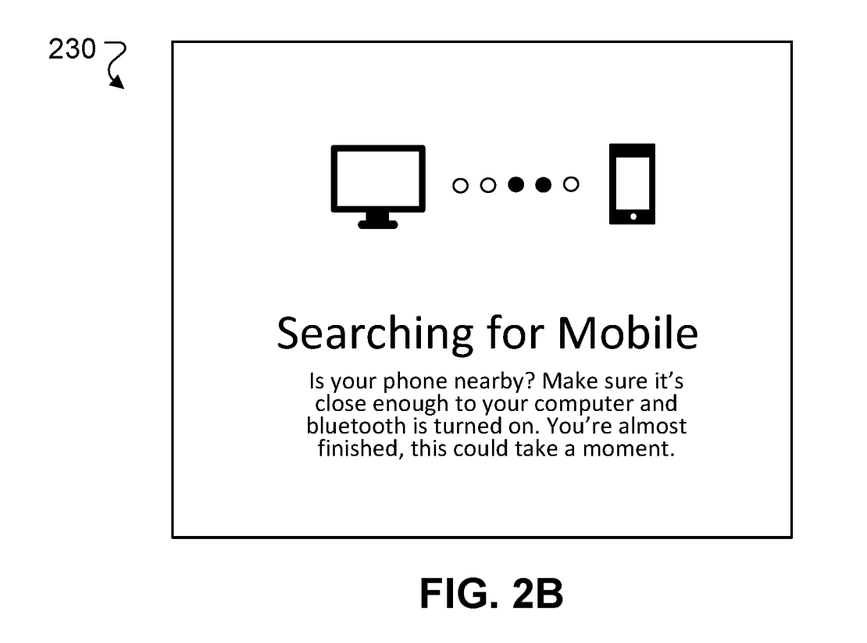
Figure 2C:
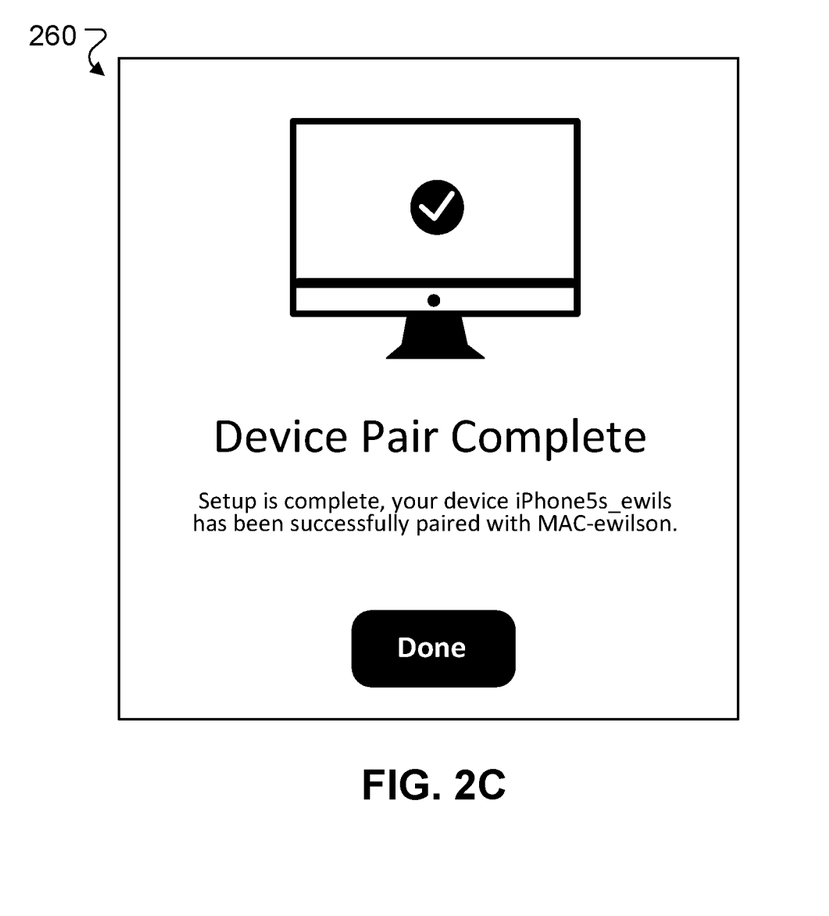

FIGS. 2A-C are example user interfaces 200, 230, 260, from a workstation that enables log-in via Bluetooth. The user interfaces 200, 230, 260 are described as being displayed by workstation 110 of system 100 shown in FIG. 1. However, the user interfaces may be displayed by workstations in other systems.

User interface 200 may be initially displayed when a user wishes to log into the workstation 110. The user interface 200 may include a QR code that may be scanned by a mobile device. The user interface 200 may also indicate an amount of time that the QR code is valid. For example, the user interface 200 includes a timer that indicates that the particular QR code shown is valid for forty-nine more seconds. Once the timer expires, e.g., reaches zero, a new QR code may be displayed.

User interface 230 may be displayed while the workstation 110 is being paired with a mobile device that scanned the QR code. The user interface 230 may indicate that the pairing is in progress and that the user should wait.

User interface 260 may be displayed once the workstation 110 has successfully paired with the mobile device. The user interface 260 may indicate a mobile device with a particular identifier, e.g., "iPhone5s_ewils." indicated by the mobile device has been successfully paired with a unique identifier, e.g., "MAC-ewilson" for the workstation 110. The identifiers for the mobile device and the workstation 110 may assure the user that the correct mobile device has been paired with the correct workstation 110.

FIGS. 3A-D are example user interfaces 300, 330, 360, 380 from a workstation that enables log-in via Bluetooth. The user interfaces 300, 330, 360, 380 are described as being displayed by the workstation 110 of system 100 shown in FIG. 1. However, the user interfaces may be displayed by workstations in other systems.

Figure 3A:
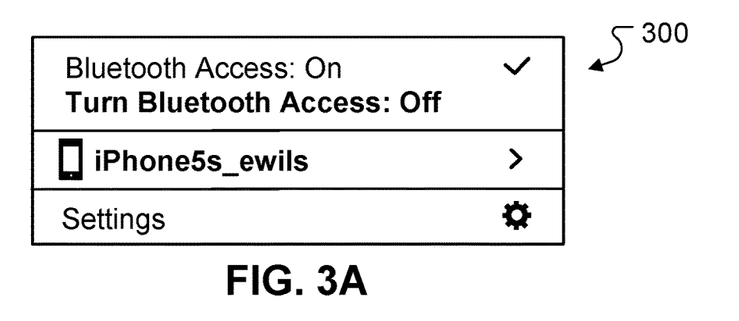
FIGS. 3A-D are example user interfaces from a workstation that has been paired with a mobile device.

User interface 300 illustrates that after the mobile device 120 is paired with the workstation 110, Bluetooth access may be on by default. The user may then use Bluetooth to lock and unlock the workstation 110.

Figure 3B:
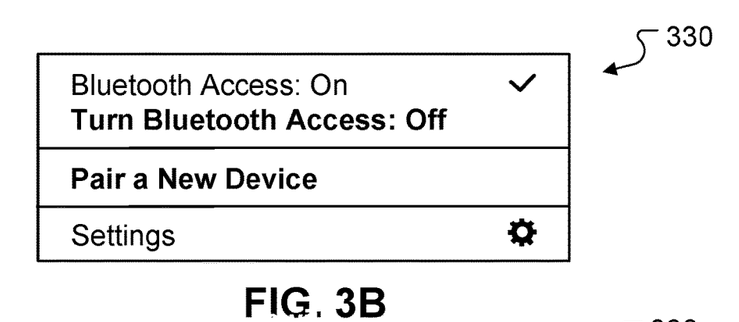

User interface 330 illustrates that when Bluetooth access is off, the user may not be able to use Bluetooth for locking or unlocking the workstation 110.

Figure 3C:
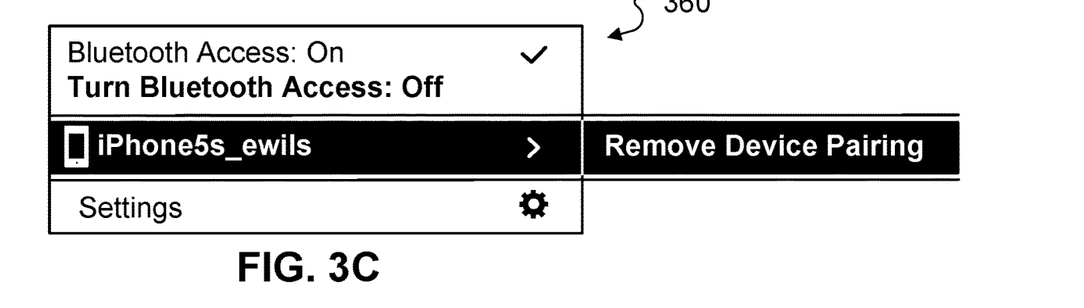

User interface 360 illustrates that a user may be able to remove a mobile device pairing. When the user removes a mobile device pairing, the user may no longer able to log into the workstation 110 using Bluetooth.

Figure 3D:
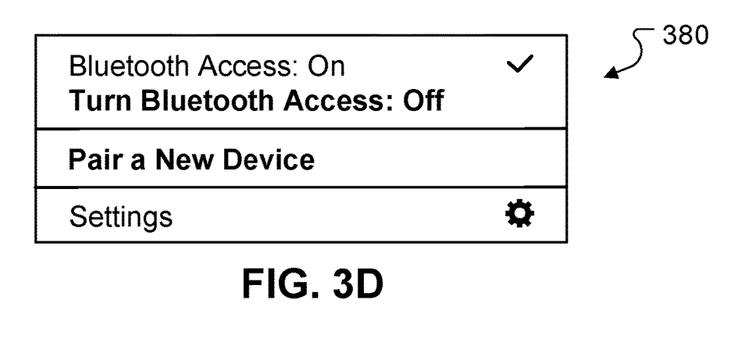

User interface 380 illustrates that after a user removes a device pairing the user may select to pair a new device to be brought to the interfaces shown in FIGs. A-C.

Figure 4A:
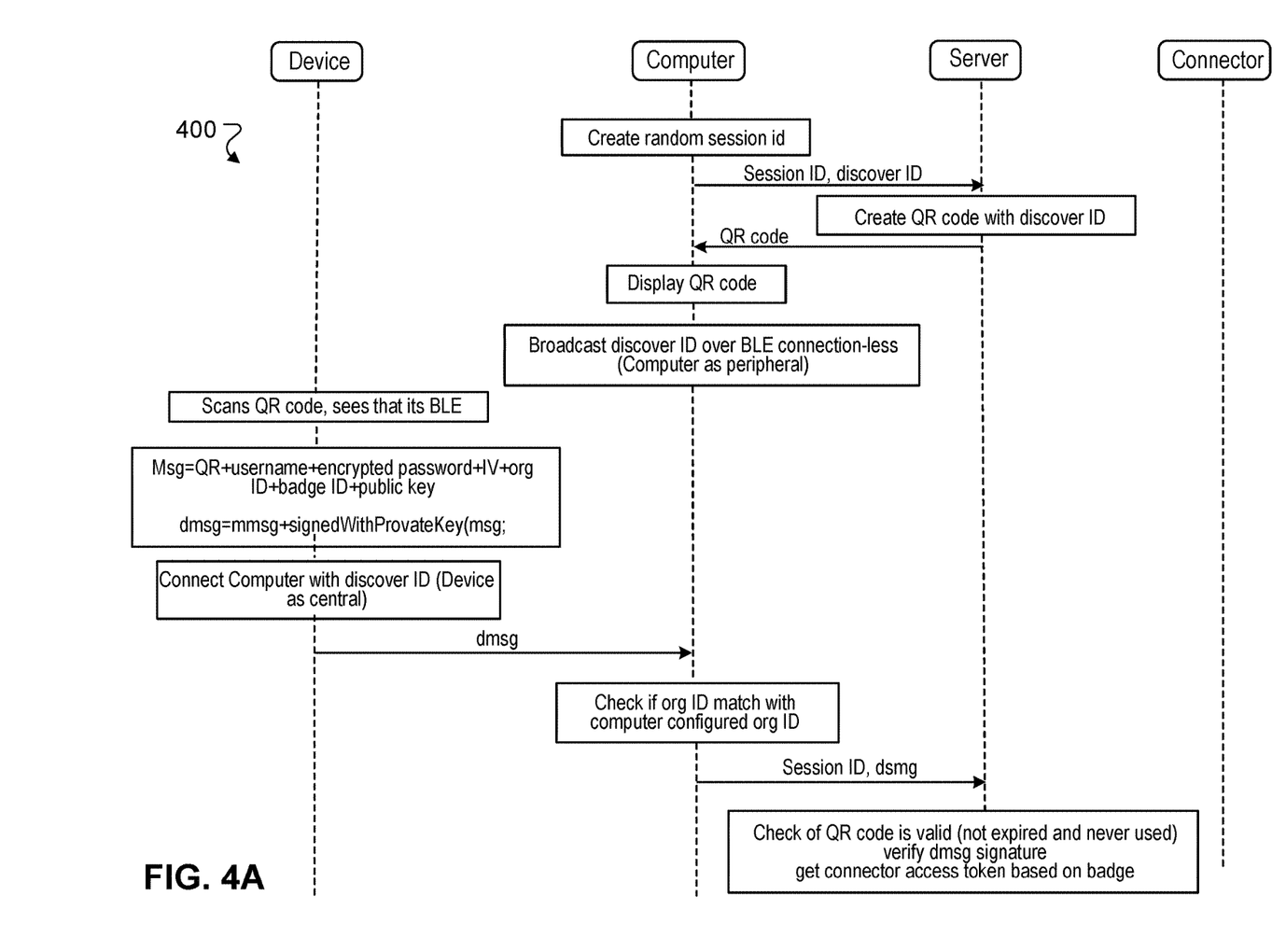
FIGS. 4A and 4B are example messaging diagrams that illustrate messages that enable log-in via Bluetooth.
Figure 4B:
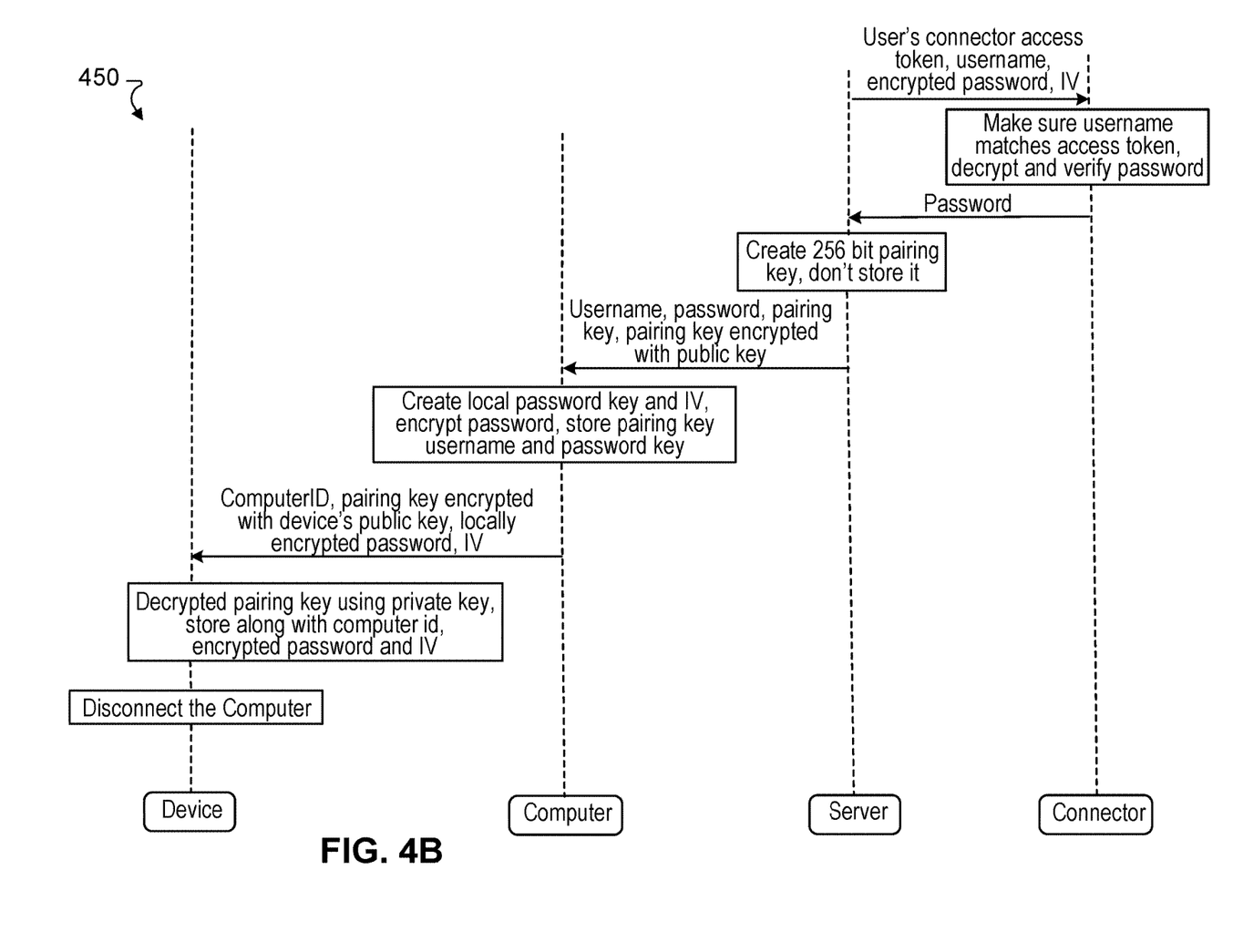

FIGS. 4A and 4B are example messaging diagrams 400A and 400B that illustrate messages that enable log-in via Bluetooth. Messaging diagrams as used in this description may refer to workflow diagrams. The messages shown in FIG. 4A may continue in FIG. 4B. The messaging diagrams are described as illustrating messages sent in the system 100 shown in FIG. 1. However, the messages may be sent in other systems.

The workstation 110, also referred to as "computer," may generate a random session identifier and transmit a request for a QR code to the server 130. The request for the QR code may include the session identifier and a discover identifier. The discover identifier may correspond with a unique identifier for the workstation 110.

The QR code may only be valid for a predetermined period of time, e.g., five minutes or one minute, from issuance by the server 130 and after the predetermined period of time, the workstation 110 may prompt the server 130 for a new QR code using a new session identifier. In another example, the workstation 110 may prompt the server 130 for a new QR code in response to the user requesting to scan a QR code to log into the workstation 110.

The server 130 may generate the QR code to indicate the discover identifier and the session identifier. The server 130 may provide the QR code to the workstation 110. The workstation 110 may then display the received QR code and use Bluetooth to broadcast the discover identifier.

The mobile device 120 may scan the QR code and determine from the QR code to perform a log-in operation using Bluetooth. In response to determining to perform a log-in operating using Bluetooth, the mobile device 120 may determine that it is receiving from the workstation 110 a Bluetooth broadcast with a discover identifier that matches the discover identifier indicated by the QR code. In response, the mobile device 120 may determine to pair with the workstation 110 and then pair with the workstation 110.

The mobile device 120 may then generate message including the QR code, a user name, a password encrypted with a connector password key, an initialization vector, an organization identifier, a badge identifier, and a public key of the mobile device 120. The connector password key may be a symmetric key to which only the connector 140 has access. The initialization vector may be a random vector that was used by a connector to encrypt the password. The organization identifier may be an identifier of a particular organization for which the mobile device 120 may be used to log-in. The badge identifier may be an identifier of a particular connector for decrypting the password and authenticating the user name and password. The public key of the mobile device 120 may be a public key of a public-private key pair that may be used by the mobile device 120 to sign data.

The mobile device 120 may also generate a signed version of the message using a private key of the public key pair and provide both the message and the signed version of the message to the workstation 110 via Bluetooth.

The workstation 110 may receive the message and the signed version of the message and check that the organization identifier received from the mobile device 120 matches an organizational identifier that the workstation 110 is associated with. If there is a match, the workstation 110 may then provide the session identifier, the message, and the signed copy of the message to the server 130 to the server 130.

The server 130 may check if the QR code included in the message was valid. For example, the server 130 may determine that the server 130 did not receive a previous message including the same QR code and that the QR code is not yet expired. The server 130 may verify that the signed copy of the message matches the message by decrypting the signed copy of the message with the received public key of the mobile device 120. After determining the QR code is valid and verifying the message, the server 130 may determine a connector access token for the user based on the badge identifier and the user name, and determine a connector to decrypt the encrypted password based on the badge identifier.

The server 130 may provide the connector access token for the user, the user name, the encrypted password, and the initialization vector to the determined connector 140. The connector 140 may then verify that the user name matches the connector access token. In response to verifying, the connector 140 may then decrypt the password encrypted using the connector password key with the initialization vector. The connector 140 may then authenticate the user name and password by verifying that the decrypted password is the correct password for the user name. In response to verifying, the connector 140 may provide the unencrypted password to the server 130.

The server 130 may generate a pairing key. The pairing key may be a 256-bit symmetric key that is used for securing communications between a particular paired device, e.g., the mobile device 120, and a particular workstation, e.g., workstation 110. The server 130 may provide the user name, the unencrypted password, the pairing key, and the pairing key encrypted with the mobile device's public key to the workstation 110.

The workstation 110 may generate a local password key and a second initialization vector. The workstation 110 may then encrypt the received unencrypted password using the local password key and the second initialization vector. The workstation 110 may store the pairing key, the user name, and the password key, and may provide the unique identifier for the workstation 110, the pairing key encrypted with the mobile device's 120 public key, the password encrypted with the local password key, and the second initialization vector to the mobile device 120.

The mobile device 120 may decrypt the pairing key using the private key of the mobile device 120 and store the unencrypted pairing key in association with the unique identifier for the workstation 110, the password encrypted with the local password key, and the second initialization vector.

Figure 5:
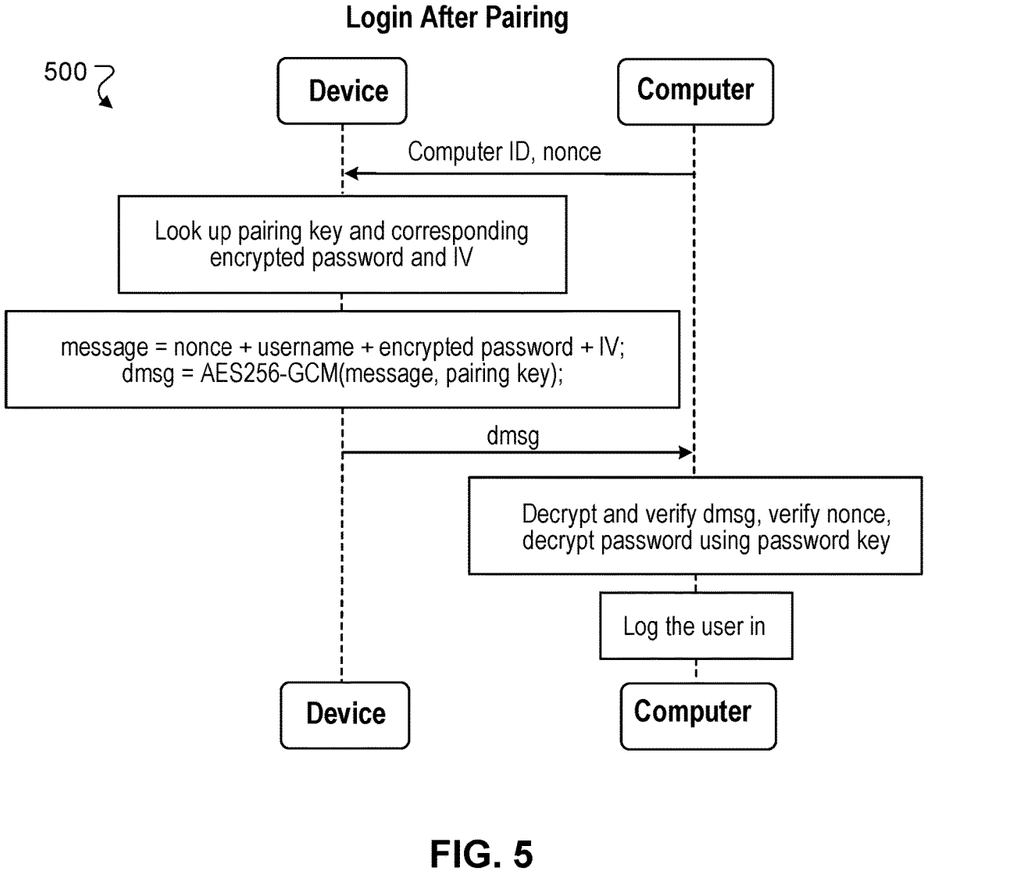
FIG. 5 is an example messaging diagram that illustrates messages after a pairing.

FIG. 5 is an example messaging diagram 500 that illustrates messages after a pairing. The messaging diagram 500 is described as illustrating messages sent in the system 100 shown in FIG. 1. However, the messages may be sent in other systems.

After the mobile device 120 and the workstation 110 are paired, for example, by a Bluetooth connection, and the user requests to log-in via Bluetooth, the workstation 110 may provide the unique identifier for the workstation 110 and a nonce to the mobile device 120. The nonce may be an arbitrary number used in cryptographic communication and may be changed each time the user wishes to log-in. The nonce may ensure authentication by preventing a replay attacks using old nonces.

In response, the mobile device 120 may determine if the mobile device 120 is storing, for the received unique identifier, a pairing key and a corresponding password encrypted with a local password key for the workstation 110 and an initialization vector that was used to encrypt the password.

In response to the mobile device 120 determining that information is stored, the mobile device 120 may then generate a message including the nonce, the user name, the password encrypted with the local password key, and the initialization vector that was used to encrypt the password. The mobile device 120 may also generate a signed version of the message using the pairing key. The mobile device 120 may then provide both the message and the signed message to the workstation 110.

The workstation 110 may receive the message and the signed message and decrypt the signed message to verify that the mobile device 120 signed the message, and verify that the nonce in the message matches the nonce that the workstation 110 provided to the mobile device 120. In response to successful verifications, the workstation 110 may then access the local password key stored for the user name, and decrypt the password using the local password key and the initialization vector in the message. The workstation 110 may then use the user name and decrypted password to log-in the user. If the decryption fails, or if the nonce does not match the value provided earlier, or if the password is incorrect, then log-in does not occur.

Figure 6:
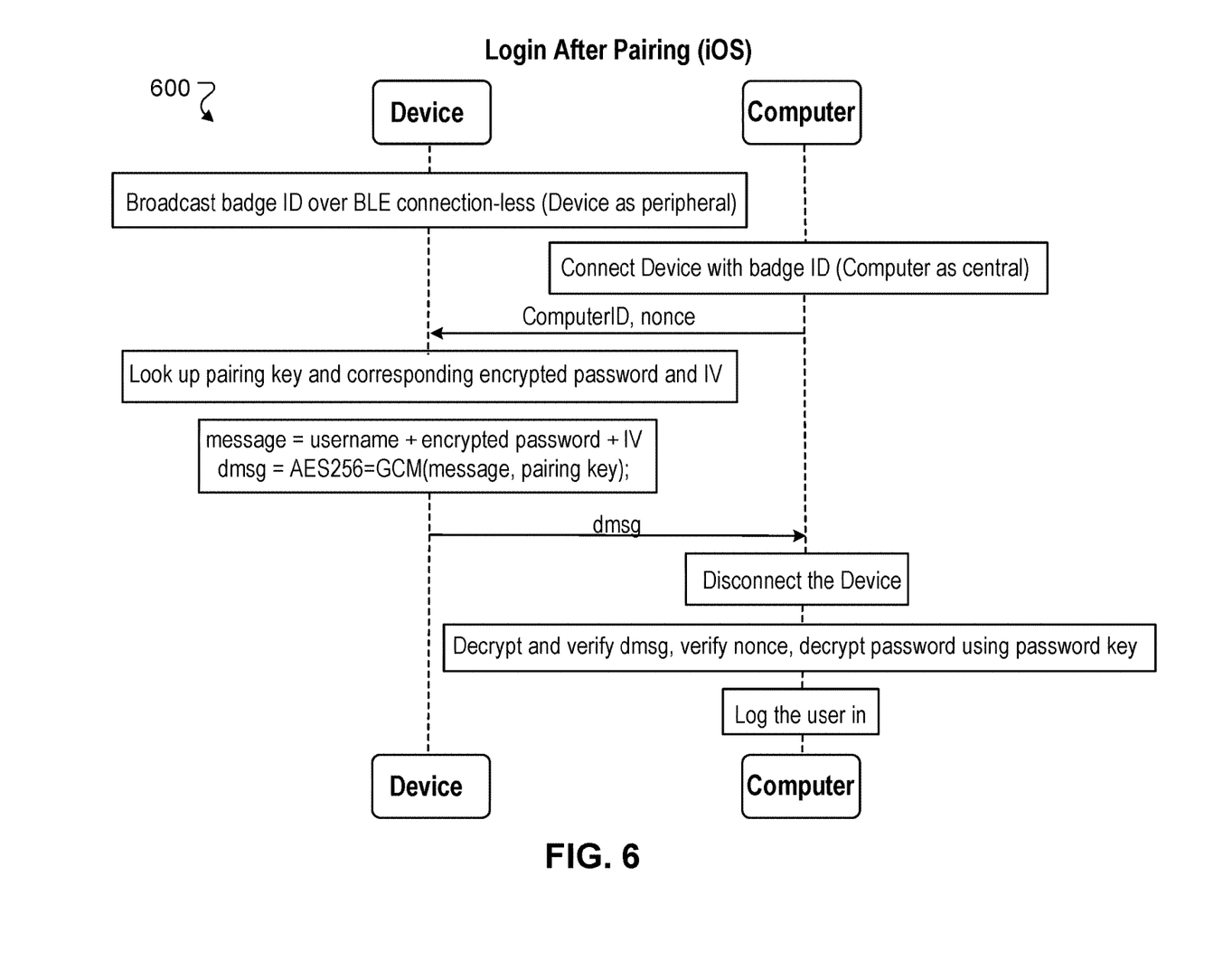
FIG. 6 is an example alternate messaging diagram that illustrates messages after a pairing.

FIG. 6 is an example alternate messaging diagram 600 that illustrates messages after a pairing. In messaging diagram 600, the mobile device 120 may be function as a peripheral device in a pairing and the workstation 110 may function as a central device in the pairing. The mobile device 120 may function as a peripheral for an Apple operating system. The mobile device 120 may broadcast a badge identifier and the workstation 110 may determine that the workstation 110 is paired with the mobile device 120. The messages may then proceed as described in FIG. 5.

Figure 7:
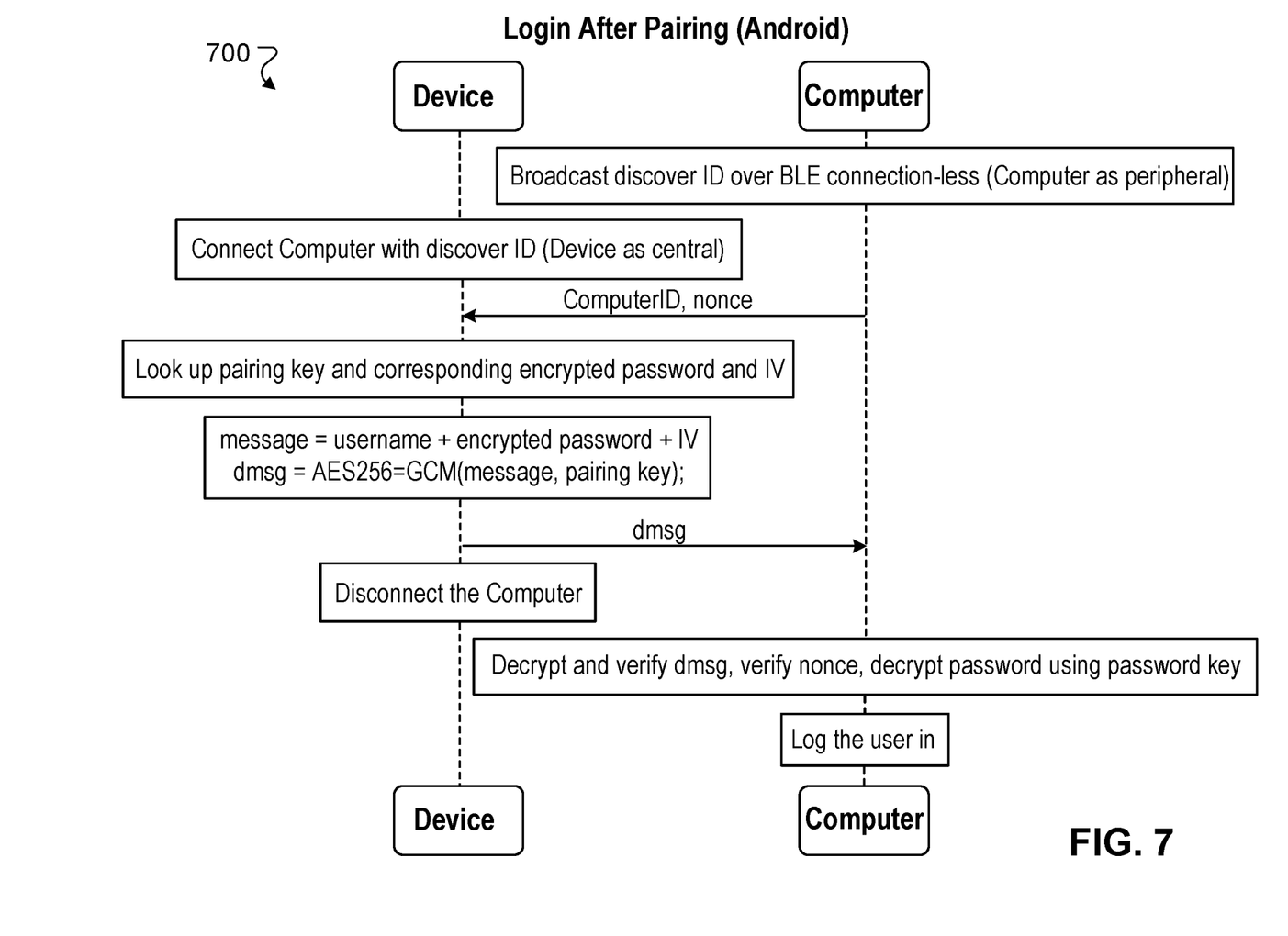
FIG. 7 is an example additional alternate messaging diagram that illustrates messages after a pairing.

FIG. 7 is an example additional alternate messaging diagram 700 that illustrates messages after a pairing. In messaging diagram 700, the mobile device 120 may be function as a central device in a pairing and the workstation 110 may function as a peripheral device in the pairing. The mobile device 120 may function as a central device for an Android operating system. The workstation 110 may broadcast a discover identifier and the mobile device 120 may determine that the mobile device 120 is paired with the workstation 110. The messages may then proceed as described in FIG. 5.

Figure 8:
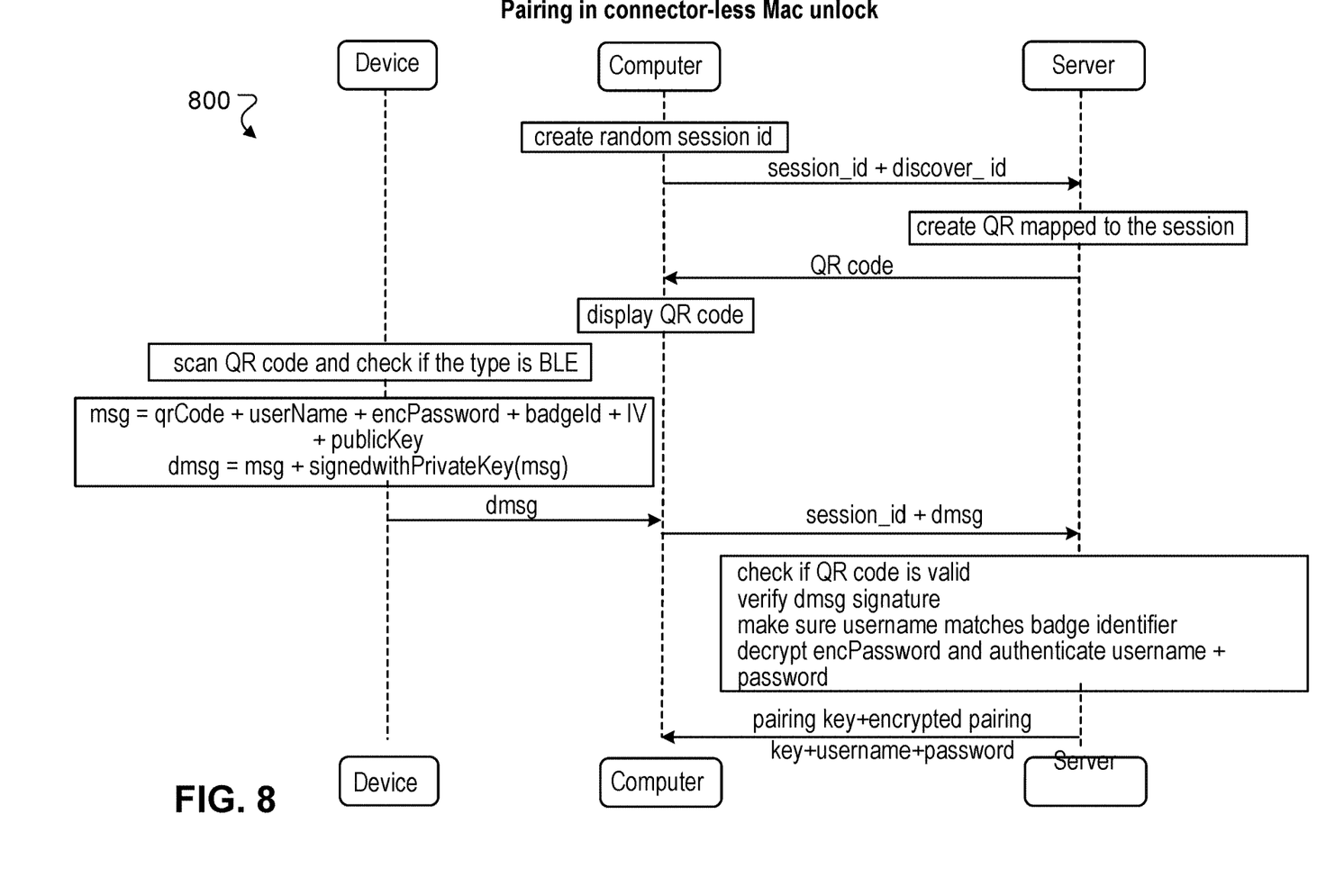
FIG. 8 is an example additional alternate messaging diagram that illustrates messages that enable log-in via Bluetooth.

FIG. 8 is an example additional alternate messaging diagram 800 that illustrates messages that enable log-in via Bluetooth. Messaging diagram 800 has similarities with messaging diagrams 400 and 450, except the functionality of the connector 140 in messaging diagrams 400 and 450 may be incorporated into the server 130. Particularly, the password encrypted with the connector password key may instead be a password encrypted with a server password key, e.g., with "encPassword" representing the encrypted password, where only the server 130 has access to the server password key. The server may instead verify that a user name matches a badge identifier, decrypt the encrypted password using the server password key, and authenticate the combination of the user name and password.

Different configurations of the system 100 may be used where functionality of the workstation 110, the mobile device 120, the server 130, and the connector 140 may be combined, further separated, distributed, or interchanged. The system 100 may be implemented in a single device or distributed across multiple devices. For example, the connector 140 may be incorporated in the server 130 so that the functions performed by the connector 140 may instead be performed by the server 130.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A method performed by a computer system, the method comprising:
providing, to a mobile device paired with the computer system, a nonce and an identifier for the computer system;
receiving, by the computer system from the mobile device, an encrypted message that was encrypted using a pairing key for the pairing of the computer system and the mobile device, wherein the encrypted message comprises an encrypted form of the nonce, a password encrypted with a password key for the computer system, and an initialization vector that was used to encrypt the password with the password key;
decrypting, by the computer system, the encrypted message using the pairing key for the pairing of the computer system and the mobile device;
verifying, by the computer system, that a nonce decrypted from the encrypted message matches the nonce provided to the mobile device;
in response to successfully decrypting the encrypted message using the pairing key and verifying that the nonce decrypted from the encrypted message matches the nonce provided to the mobile device, decrypting, by the computer system, the encrypted password using (i) the password key and (ii) the initialization vector decrypted from the encrypted message; and
providing, by the computer system, the decrypted password to log-in a user corresponding to the mobile device.

2. The method of claim 1, further comprising receiving, by the computer system from the mobile device, a request to log-in to the computer system.

3. The method of claim 1, wherein the encrypted message further comprises a user name.

4. The method of claim 3, wherein providing the decrypted password to log-in the user corresponding to the mobile device further comprises providing, by the computer system, the user name from the decrypted message to log-in the user corresponding to the mobile device.

5. The method of claim 1, wherein the nonce provided to the mobile device comprises a random value generated by the computer system that corresponds to a log-in session for the mobile device.

6. The method of claim 1, in response to unsuccessfully decrypting the encrypted message or unsuccessfully verifying the nonce decrypted from the encrypted message, rejecting, by the computer system, a request from the mobile device to log-in to the computer system.

7. The method of claim 1, further comprising determining, by the computer system, that the mobile device is paired with the computer system.

8. The method of claim 7, wherein determining that the mobile device is paired with the computer system further comprises:
receiving, by the computer system from the mobile device, a badge identifier when the mobile device is in proximity to the computer system; and
determining, by the computer system from the mobile device, the badge identifier indicating that the mobile device is paired with the computer system.

9. The method of claim 7, wherein determining that the mobile device is paired with the computer system further comprises:
broadcasting, by the computer system, a discover identifier; and
receiving, by the computer system from the mobile device, an indication that the mobile device is paired with the computer system.

10. The method of claim 1, further comprising:
providing, by the computer system to the mobile device, a request for an optical machine readable representation that may be scanned to perform a log-in operation;
receiving, by the computer system and from the mobile device, the optical machine readable representation; and
displaying, by the computer system, the optical machine readable representation.

11. A system comprising:
a computer system comprising one or more computers; and
one or more computer-readable media storing instructions that, when executed by the one or more computers, cause the one or more computers to perform operations comprising:
providing, to a mobile device paired with the computer system, a nonce and an identifier for the computer system;
receiving, by the computer system from the mobile device, an encrypted message that was encrypted using a pairing key for the pairing of the computer system and the mobile device, wherein the encrypted message comprises an encrypted form of the nonce, a password encrypted with a password key for the computer system, and an initialization vector that was used to encrypt the password with the password key;
decrypting, by the computer system, the encrypted message using the pairing key for the pairing of the computer system and the mobile device;
verifying, by the computer system, that a nonce decrypted from the encrypted message matches the nonce provided to the mobile device;
in response to successfully decrypting the encrypted message using the pairing key and verifying that the nonce decrypted from the encrypted message matches the nonce provided to the mobile device, decrypting, by the computer system, the encrypted password using (i) the password key and (ii) the initialization vector decrypted from the encrypted message; and
providing, by the computer system, the decrypted password to log-in a user corresponding to the mobile device.

12. The system of claim 11, further comprising receiving, by the computer system from the mobile device, a request to log-in to the computer system.

13. The system of claim 11, wherein the encrypted message further comprises a user name.

14. The system of claim 13, wherein providing the decrypted password to log-in the user corresponding to the mobile device further comprises providing, by the computer system, the user name from the decrypted message to log-in the user corresponding to the mobile device.

15. The system of claim 11, wherein the nonce provided to the mobile device comprises a random value generated by the computer system that corresponds to a log-in session for the mobile device.

16. The system of claim 11, in response to unsuccessfully decrypting the encrypted message or unsuccessfully verifying the nonce decrypted from the encrypted message, rejecting, by the computer system, a request from the mobile device to log-in to the computer system.

17. The system of claim 11, further comprising determining, by the computer system, that the mobile device is paired with the computer system.

18. The system of claim 17, wherein determining that the mobile device is paired with the computer system further comprises:
   receiving, by the computer system from the mobile device, a badge identifier when the mobile device is in proximity to the computer system; and
   determining, by the computer system from the mobile device, the badge identifier indicating that the mobile device is paired with the computer system.

19. The system of claim 17, wherein determining that the mobile device is paired with the computer system further comprises:
   broadcasting, by the computer system, a discover identifier; and
   receiving, by the computer system from the mobile device, an indication that the mobile device is paired with the computer system.

20. One or more non-transitory computer-readable media storing instructions that, when executed by one or more computers of a computer system, cause the one or more computers to perform operations comprising:
   providing, to a mobile device paired with the computer system, a nonce and an identifier for the computer system;
   receiving, by the computer system from the mobile device, an encrypted message that was encrypted using a pairing key for the pairing of the computer system and the mobile device, wherein the encrypted message comprises an encrypted form of the nonce, a password encrypted with a password key for the computer system, and an initialization vector that was used to encrypt the password with the password key;
   decrypting, by the computer system, the encrypted message using the pairing key for the pairing of the computer system and the mobile device;
   verifying, by the computer system, that a nonce decrypted from the encrypted message matches the nonce provided to the mobile device;
   in response to successfully decrypting the encrypted message using the pairing key and verifying that the nonce decrypted from the encrypted message matches the nonce provided to the mobile device, decrypting, by the computer system, the encrypted password using (i) the password key and (ii) the initialization vector decrypted from the encrypted message; and
   providing, by the computer system, the decrypted password to log-in a user corresponding to the mobile device.

* * * * *